United States Patent [19]

Fijany et al.

[11] Patent Number: 5,361,367
[45] Date of Patent: Nov. 1, 1994

[54] HIGHLY PARALLEL RECONFIGURABLE COMPUTER ARCHITECTURE FOR ROBOTIC COMPUTATION HAVING PLURAL PROCESSOR CELLS EACH HAVING RIGHT AND LEFT ENSEMBLES OF PLURAL PROCESSORS

[75] Inventors: Amir Fijany, Sherman Oaks; Antal K. Bejczy, Pasadena, both of Calif.

[73] Assignee: The United States of America as represented by the Administrator of the National Aeronautics and Space Administration, Washington, D.C.

[21] Appl. No.: 712,796

[22] Filed: Jun. 10, 1991

[51] Int. Cl.[5] .................... G06F 9/00; G06F 15/16
[52] U.S. Cl. .................... 395/800; 395/375; 364/DIG. 1; 364/231.9
[58] Field of Search .................... 395/800, 375, 84

[56] References Cited

U.S. PATENT DOCUMENTS

| | | | |
|---|---|---|---|
| 3,753,238 | 8/1973 | Tutelman | 364/DIG. 1 |
| 4,441,152 | 4/1984 | Matsuura et al. | 364/DIG. 1 |
| 4,467,436 | 8/1984 | Chance et al. | 364/513 |
| 4,470,114 | 9/1984 | Gerhold | 364/DIG. 1 |
| 4,547,345 | 3/1986 | Konesky | 364/DIG. 1 |
| 4,574,394 | 3/1986 | Holsztynski et al. | 382/41 |
| 4,591,981 | 5/1986 | Kassabov | 364/DIG. 1 |
| 4,633,392 | 12/1986 | Vincent et al. | 364/DIG. 1 |
| 4,684,862 | 8/1987 | Röhrle | 318/568 |
| 4,736,291 | 4/1988 | Jennings et al. | 364/DIG. 1 |
| 5,163,120 | 10/1992 | Childers et al. | 395/800 |
| 5,218,709 | 6/1993 | Fijany et al. | 395/800 |

OTHER PUBLICATIONS

Sadayappan et al., "A Restructurable VLSI Robotics Vector Processor Architecture for Real-Time Control", IEEE, Nov. 1989.

Ling et al., A VLSI Robotics Vector Processor For Real-Time Control; IEEE, 1988.

Amin-Javaheri et al., "Systolic Architecture for the Manipulator Inertia Matrix", IEEE Dec. 1988.

Fijany et al., "A Class of Parallel Algorithms for Computation of the Manipulator Inertia Matrix", Nov. 1989; IEEE.

*Primary Examiner*—Alyssa H. Bowler
*Assistant Examiner*—L. Donaghue
*Attorney, Agent, or Firm*—John H. Kusmiss; Thomas H. Jones; Guy M. Miller

[57] ABSTRACT

In a computer having a large number of single-instruction multiple data (SIMD) processors, each of the SIMD processors has two sets of three individual processor elements controlled by a master control unit and interconnected among a plurality of register file units where data is stored. The register files input and output data in synchronism with a minor cycle clock under control of two slave control units controlling the register file units connected to respective ones of the two sets of processor elements. Depending upon which ones of the register file units are enabled to store or transmit data during a particular minor clock cycle, the processor elements within an SIMD processor are connected in rings or in pipeline arrays, and may exchange data with the internal bus or with neighboring SIMD processors through interface units controlled by respective ones of the two slave control units.

23 Claims, 4 Drawing Sheets

FIG. 6a  MAJOR CLOCK 
FIG. 6b  MINOR CLOCK 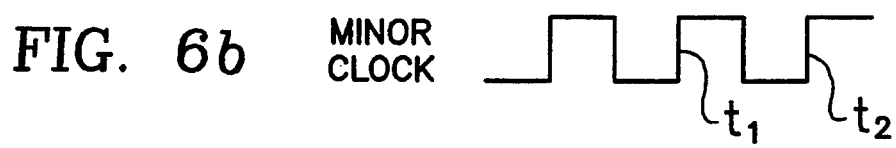

HIGHLY PARALLEL RECONFIGURABLE COMPUTER ARCHITECTURE FOR ROBOTIC COMPUTATION HAVING PLURAL PROCESSOR CELLS EACH HAVING RIGHT AND LEFT ENSEMBLES OF PLURAL PROCESSORS

ORIGIN OF THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

1. Technical Field

The invention is related to computers for use robotics in which most computations involve vectors in Euclidian space and transformation matrices therefore. In particular, the invention is related to computers whose architecture is reconfigurable among a plurality of processor elements.

2. Background of the Invention

Two classes of computation-intensive problems can be distinguished in robotics applications. The first comprises the rather specific kinematics and dynamics problems required for real-time control, simulation, dynamic trajectory generation and path planning.

Inadequate computing power has always been the major obstacle in real-time implementation of advanced robotic schemes, due to the computational cost of the evaluation of required kinematic and dynamic models. Dynamic simulation of the robot arm requires even more computing power than does control. The problem becomes more difficult for direct-drive arms, representing even faster dynamics, and for redundant and multiple arms, which involve more degrees of freedom. Fast dynamic trajectory generation and path planning demand even far more computing power. It is widely recognized that parallel computing is the key to achieving required computing power for real-time robotic control and simulation.

The second class comprises more generic problems which require even more computation power. This second class of problems includes, for example, low level image processing, graphics display, tactile sensory processing, singular value decomposition for inverse kinematic solution of redundant arms. Therefore, computer designs for robotic application should address these two different classes of problems.

The first need is to develop a highly parallel architecture for a class of specific problems in robotics, namely kinematics and dynamics. The second need is to address the second class of problems, which require more generality and flexibility while preserving the high performance which existing parallel architectures fail to address adequately. The common features of the problems in this class are determinacy in the computing locality for communication, and the existence of fine grain parallelism.

Theoretical analyses have shown that systolic and wave front processor arrays can be used efficiently for a wide class of problems with the above-listed properties. The main advantage of systolic and wave front arrays is their capability of combining pipeline and parallel processing. This is an important feature, since in many problems pipelining presents the only opportunity of concurrent processing. Another advantages of these systolic and wave front arrays is their ability to overlap the input/output operations and computation. However, two main problems arise in practical implementation of systolic and wave front processor arrays:

1) The gap between memory and processor speed: Performance analysis of systolic and wave front arrays is based on the assumptions that parallel memory modules are available, that data are already aligned, and that data can be fed into the array with adequate speed. In practice, satisfying these assumptions, particularly for large and two-dimensional arrays, is difficult, and the resulting overhead can undermine performance. Note that these architectures are basically attached processors, and data are provided by a host processor. Therefore, data are basically provided in serial form.

2) Rigidity: In systolic arrays, unless the individual cells are programmable, maximum flexibility cannot be achieved. Lack of reconfigurability in the interconnect structure among the cells is another source of rigidity, since achieving maximum efficiency for different problems requires the capability of providing different interconnection structures. However, due to practical problems such as clock distribution, even for arrays with static interconnections, practical implementations have been confined to one-dimensional arrays.

It is an object of the invention to implement an architecture capable of achieving the efficiency and generality of systolic arrays, by overcoming the foregoing difficulties.

DISCLOSURE OF THE INVENTION

The invention is a computer having a highly parallel architecture which includes an internal host computer controlling user interfaces and connected through an internal bus to a large number of single-instruction multiple data (SIMD) processors. In the preferred embodiment of the invention, each of the SIMD processors has two sets of three individual processor elements controlled by a master control unit and interconnected among a plurality of register file units where data is stored. The register files input and output data in synchronism with a minor cycle clock under control of two slave control units controlling the register file units connected to respective ones of the two sets of processor elements. Depending upon which ones of the register file units are enabled to store or transmit data during a particular minor clock cycle, the processor elements within an SIMD processor are connected in rings or in pipeline arrays, and may exchange data with the internal bus or with neighboring SIMD processors through interface units controlled by respective ones of the two slave control units. Arithmetic operations are performed by the processor elements in synchronism with a major cycle clock under control of a master control unit. The master control unit also controls a multiplexer connected between the two sets of three processor elements. The multiplexer can isolate the two sets of processor elements or connect them together in a long ring of six processor elements.

For certain types of kinematic or dynamic computations, data flow through the register file units is controlled by the slave control units so that the three processor elements of each set operate together in a ring (or in parallel) to perform three-dimensional vector arithmetic, or the six processors of both sets operate in parallel together to perform three-dimensional matrix multiplication. In this mode, each processor would handle one component of a three-component vector and perform the same type of arithmetic operation repetitively. This exploits the concurrency such vector operations to the greatest extent possible.

For other types of instructions, data flow through the register file units and through the multiplexer is controlled by the slave control units and the master control unit, respectively, in a different manner so that the processor elements operate in pipeline fashion and receive and communicate results with adjacent SIMD processors, rather than with the internal bus. Thus, the whole set of SIMD processors can be configured to operate as a pipeline array of processor elements. In one embodiment of this configuration, one of the three sets of processor elements in each SIMD processor processes data received from its left-hand neighbor SIMD processor and passes the results to its right-hand neighbor, while the other set of three processor elements processes data received from its right-hand neighbor SIMD processor and passes the results to its left-hand neighbor. This provides simultaneous bi-directional data communication among the processor elements. If the data flow is all in one direction, then the two groups of processor elements in each SIMD processor may operate as two successive stages of a pipeline processor. If there are n SIMD processors in the computer, then the pipeline configuration may be used as a 2 n stage pipe or as two pipes each with n stages.

How the control units choose to reconfigure or route data flow within an SIMD processor depends upon the type of instruction which is to be performed during the next major clock cycle. The master control unit determines from the type of instruction to be performed during the next major clock cycle which type of configuration would be best suited to the particular instruction.

Pipelining and parallel or ring processing can be achieved simultaneously on two different levels by pipelining the successive SIMD processors through the interface units connecting adjacent SIMD processors, while within each SIMD processor connecting the two sets of processor elements in rings (to perform vector operations, for example, as discussed above).

The flexibility which permits the computer to change at each major clock cycle from one to another of any of the foregoing configurations provides the possibility of developing a wide variety of algorithms to cope with different problems.

Synergism is also employed in the interconnection topology. The basic interconnection among the processor elements in an SIMD processor is a ring, which allows a reliable clock distribution among processor elements and particularly fast a parallel communication between the adjacent SIMD processors. The lack of higher dimensional connectivity has been compensated by two features. First, the memory organization and extensive data path of each processor allows different interconnection among the processing elements. Secondly, the speed of communication between processors allows efficient and dynamic establishment of different topologies among the processor elements of adjacent SIMD processors. (In other words, adjacent SIMD processors can be configured differently during a given major clock cycle.) Hence, the architecture can emulate, under program control, different two-dimensional topologies among the processor elements, such as mesh topologies, for example.

The high programmability of the architecture of the invention contributes to the overall generality of the computer, providing adaptability to a wide class of problems. It provides an efficient solution to the problem of variations in cardinality (the difference between the number of processes and the number of processors) and topologies (as described above). Failure to provide for such variations has been the main source of rigidity and inefficiency of SIMD architectures such as systolic and wave front arrays of the prior art.

BRIEF DESCRIPTION OF THE DRAWINGS

Preferred embodiment of the invention are described in detail below with reference to the accompanying drawings, of which:

FIGS. 6a and 6b are contemporaneous simplified timing diagrams illustrating a major clock cycle signal and a minor clock cycle signal, respectively, employed in the SIMD processor FIG. 2;

MODES FOR CARRYING OUT THE INVENTION

For the purpose of interfacing to the outside world, the architecture is basically an attached processor which can be interfaced to the bus of an external host as a part of the bus memory. The external host can be any stand alone computer or a multiprocessor bus oriented system. The data and instructions, from the external host, and the results and the state of each instruction, from architecture, are communicated through a dual access shared memory. The architecture is activated by a procedure call from the external host, performed by a write operation in a designated address, which is interpreted as an interrupt by the architecture. The memory mapping of the architecture provides maximum speed and flexibility since the data transfer rate is limited by the read/write cycle of the external host. A bus adapter provides the required interface for different external buses.

System Overview

Figure 1:
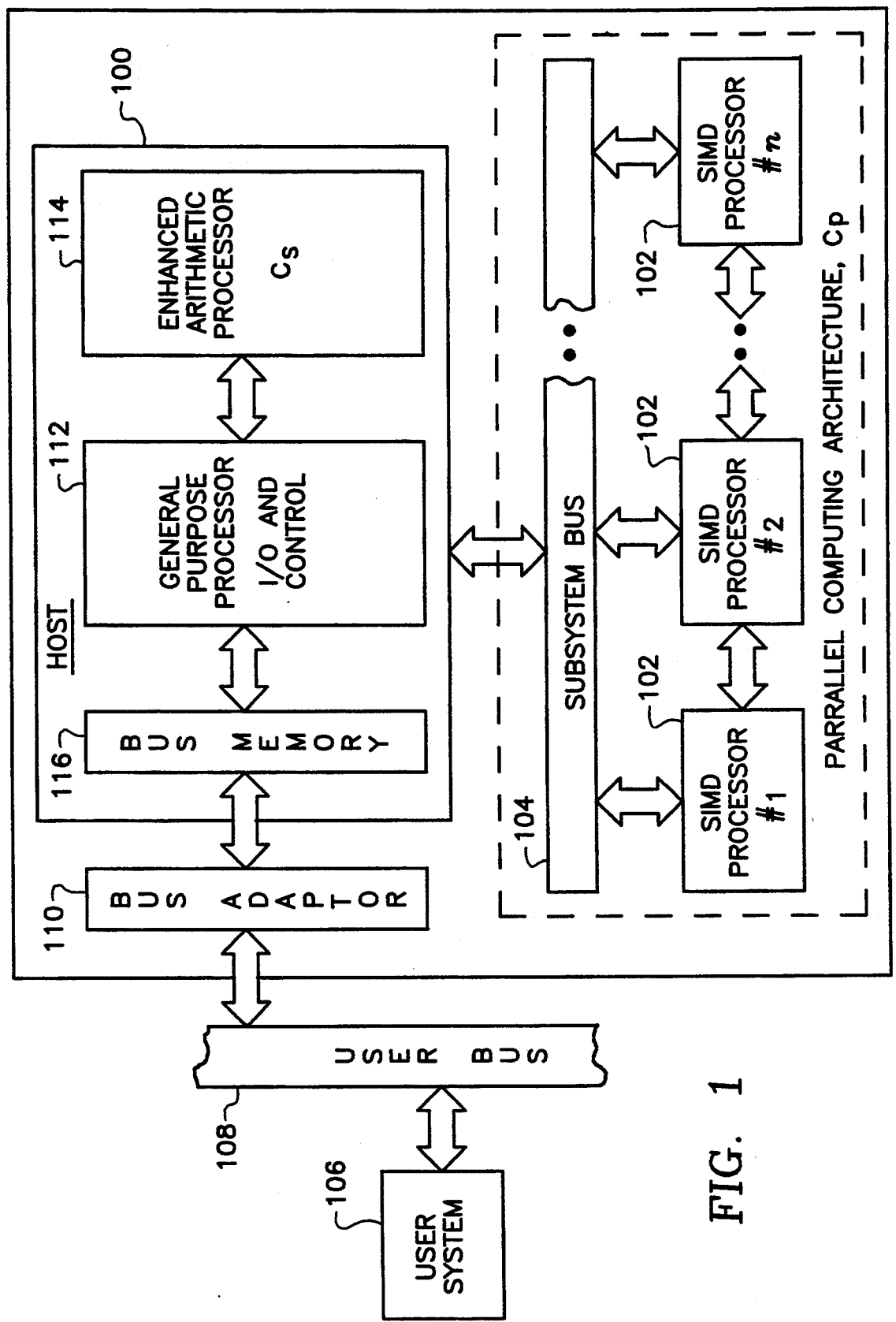
FIG. 1 is a block diagram of the highly parallel architecture computer of the invention.

Referring to FIG. 1, an internal host 100 and a large number n of SIMD processors (cells) 102 are connected to an internal bus 104. The internal host 100 is the basic control unit and handles data and control interfacing with an external host 106 and its external bus 108 through a bus adapter 110, controls the activities of the cells 102 and performs the required input/output (I/O) operations. The internal host 100 also performs any serial or data dependent computations which realize little or no advantage in a parallel architecture. The parallel computations are performed by the ensemble of cells 102. Each cell 102 is an SIMD parallel processor which can operate synchronously. Therefore, the system of FIG. 1 may be considered as an multiple instruction-multiple data (MIMD)-SIMD parallel computer.

Host Architecture

The internal host 100 consists of a 32 bit general purpose processor 112, an arithmetic co-processor 114 and a bus memory 116. The internal host 100 controls the system of FIG. 1 by interpreting instructions received from the external host 106. The internal host 100 decomposes the instructions into a series of computations to be performed by the host 100 itself (e.g., serial computations) and parallel computations to be performed by the cells 102. Depending upon the computation, the internal host 100 distributes the data among the cells 102 and initiates their activities. The activity of the cells 102 is then carries out independently from the host 100. The end of the computation is indicated by the cells 102 to the host 100, which then transfers the results to the bus memory 116, for access by the external host 106. The internal host 100 also reports the state of the operation, namely "busy" and "finished", to the external host 106.

The internal host 100 employs the arithmetic co-processor 114 in carrying out the serial or data dependent computations. The co-processor 114 can function either as a co-processor or as an attached processor. In its co-processor mode, the data are fetched by the internal host processor 100 while arithmetic operations (multiplication, addition, conversion, etc.) are performed by the co-processor 114. These arithmetic operations are transparent to the internal host processor 100 both from programming and timing points of view. This feature provides the maximum speed since the computation time is only bounded by the read/write cycle of the internal host 100. For other operations (division, square root, trigonometric functions, etc.), the co-processor functions 114 as an attached microprogrammable processor.

The Cell Architecture

The SIMD processors or cells 102 are arranged in a linear order and each is connected to the internal bus 104 as well as being connected to the adjacent SIMD processor to its left and to its right, as shown in FIG. 1. Each SIMD processor 102 has the structure illustrated in FIG. 2.

Processor Elements

In the preferred embodiment, there are six processor elements 116, each of which is a simple floating-point processor capable of performing primitive operations such as multiplication, addition, subtraction, format conversion, etc. Each processor element 116 has a 3-bus architecture with internal data paths allowing accumulative operations such as sum-of-product and Newton-Raphson division, in accordance with well-known techniques.

There are two processor element groups 118, 120 each containing three of the processor elements 116. As will be described in the next section below, the connections among the processor elements 116 may be reconfigured as desired, in accordance with the type of operation to be performed. In solving kinematic and dynamic problems, the two groups 118, 120 are separated to perform two basic matrix-vector operations in parallel while each group 118, 120 exploits the parallelism in the operation. Also, each group 118, 120 can be considered as an independent SIMD processor or a pipeline stage, providing the possibility of decomposing the architecture into two independent MIMD-SIMD processors or two n-stage pipeline processors. Otherwise, the processor elements 116 of each group 118, 120 can perform independent but similar operations. In the preferred embodiment illustrated in FIG. 2, the processor elements 116 within a group 118 or 120 share the same instruction. For matrix-matrix multiplication, the two groups 118, 120 are connected together to perform as a single group. The direct data path among the processor elements 116 within each group allows a linear interconnection among them.

Interconnection Elements

Figure 2:
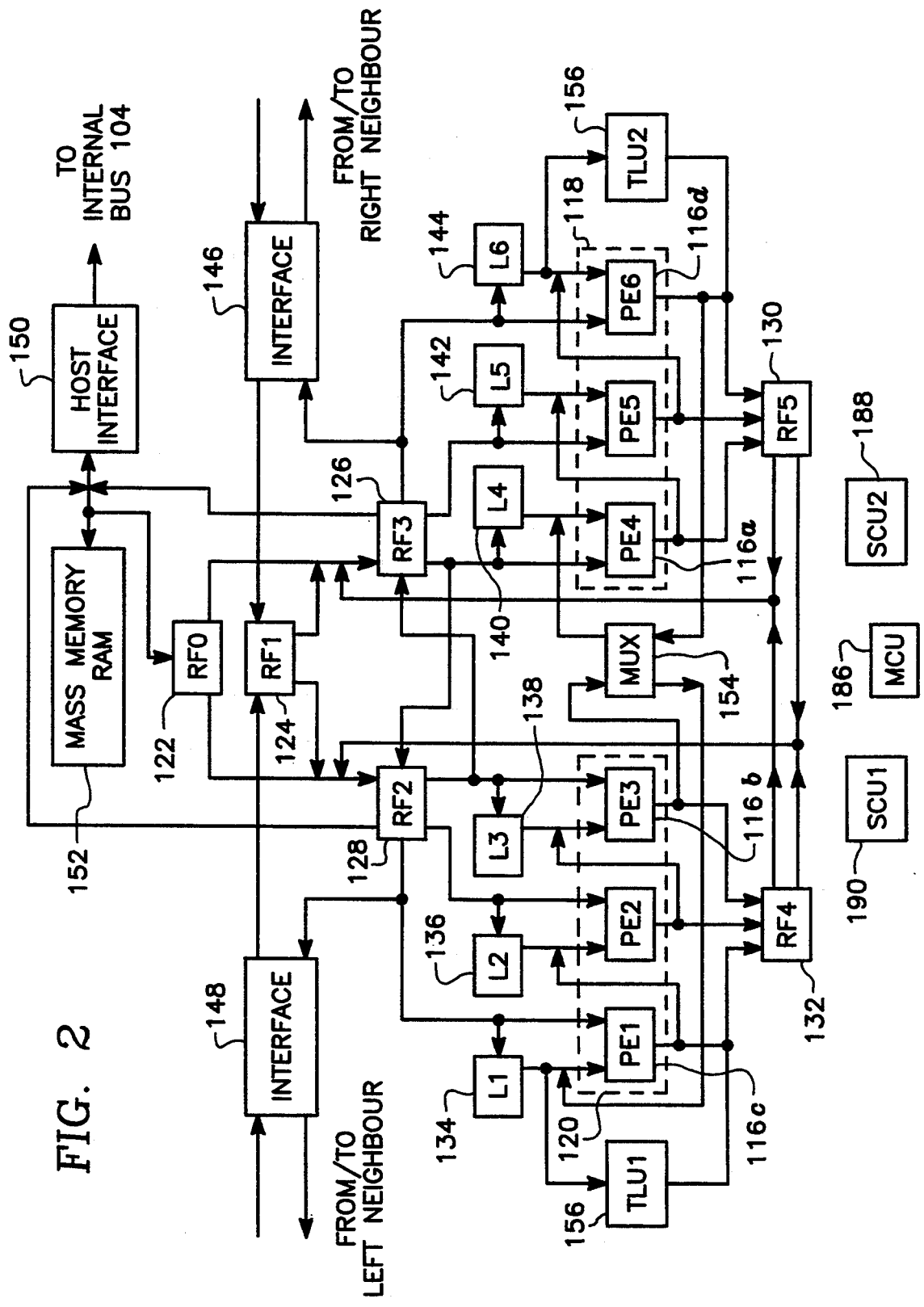
FIG. 2 is a block diagram of a typical SIMD processor employed in the computer of FIG. 1.

Data flow and interconnection among the various processor elements 116 of the two groups 118, 120 is handled by a set of register file units 122-132 and latches 134-144. Data flow with adjacent SIMD processors 102 (see FIG. 1) is handled by right and left interface units 146, 148. There are a number of data path configurations which may be selected with these interconnection elements, as illustrated in FIG. 2 and which will now be described.

Data flow from the internal host 100 via the internal bus 104 (FIG. 1) goes through a host interface 150 (FIG. 2) and the register file unit 122, and can be stored in a random access memory 152. Respective data outputs of the register file unit 122 are connected to first data inputs of the right and left register file units 126 and 128. The right and left register file units 126, 128 each have three data outputs connected respectively to the first data inputs of the three processor elements 116 of each group 118, 120. A fourth data output of each of the right and left register file units 126, 128 is connected to the host interface 150 for data output to the host 100. Each processor element 116 has a second data input connected through a latch (e.g. 134) to the first data input of the same processor element 116. Data outputs of the right and left interface units 146, 148 are connected to data inputs of the register file unit 124. The register file unit 124 has data outputs connected to the first data inputs of the right and left register file units 126, 128. Each of the output register file units 130, 132 has three data inputs each connected to the data output of a processor element 116 in a corresponding one of the two groups 118, 120. Each of the output register file units has two data outputs connected to the first data inputs of the right and left register file units 126, 128.

Each of the data outputs of the right and left register file units 126, 128 connected to the "in-board" processor elements 116a, 116b of the respective groups 118, 120 are also connected to a second data input of the other one of the right and left register file units 126, 128, providing an "in-board" connection between the two groups 118, 120. An "outboard" connection between the two groups 118, 120 is provided through a multiplexer 154. The multiplexer 154 has a first data input and a first data output connected respectively to the data output and second data input of the "in-board" processor elements 116b and 116a of the left and right groups 120, 118, respectively. The multiplexer 154 also has a second data output and a second data input connected to the second data input and the data to the data outputs of the "outboard" processor elements 116c and 116d of the left and right groups 120, 118, respectively. The data output of the right and left register file units 126, 128 which is connected to the outboard processor 116d, 116c is also connected to the data input of the right and left interface unit 146, 148, respectively, thus providing an external "outboard" connection to adjacent SIMD processors 102.

The multiplexer can establish a ring topology for each group 118, 120, or a ring topology among all six processor elements 116 or a linear (pipeline) topology among all processor elements 116. The latter configuration transforms the entire SIMD processor 102 of FIG. 2 to a pipeline processor with six uniform stages.

Right and left look-up tables 156 have data inputs and outputs connected across the second data inputs and data outputs of the right and left "outboard" processor elements 116d, 116c. Other look-up tables may be similarly connected across the other processor elements 116 of FIG. 2. The look-up tables 156 provide the seed values for initiating the division operations by Newton-Raphson methods, in accordance with well-known techniques. This feature allows the processor elements 116 to perform several divisions in parallel.

Figure 3:
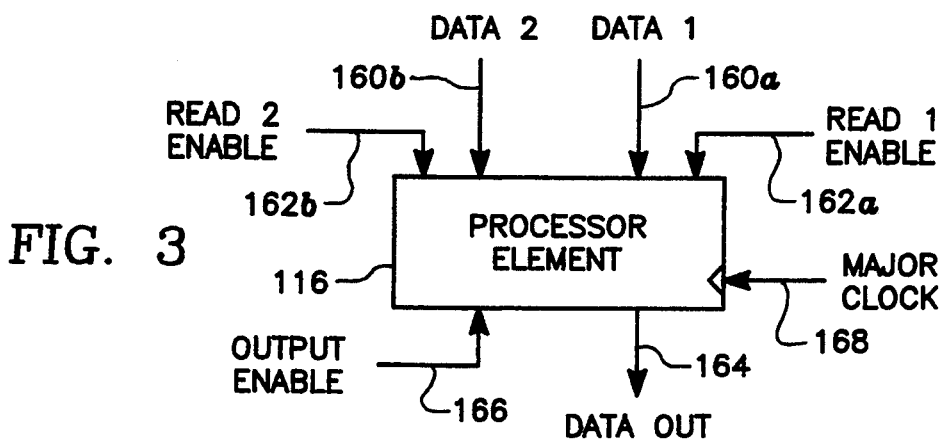
FIG. 3 is a simplified block diagram illustrating a typical processor element employed in the SIMD processor of FIG. 2.

The data inputs, data outputs and control inputs of a typical processor element 116 are illustrated in FIG. 3. Typically, there are the first and second data inputs 160a, 160b, controlled by respective READ1 and READ2 enable inputs 162a, 162b, and a data output 164 controlled by an OUTPUT enable input 166. The processor element has a major clock input 168 with which it synchronizes it arithmetic operations.

Figure 4:
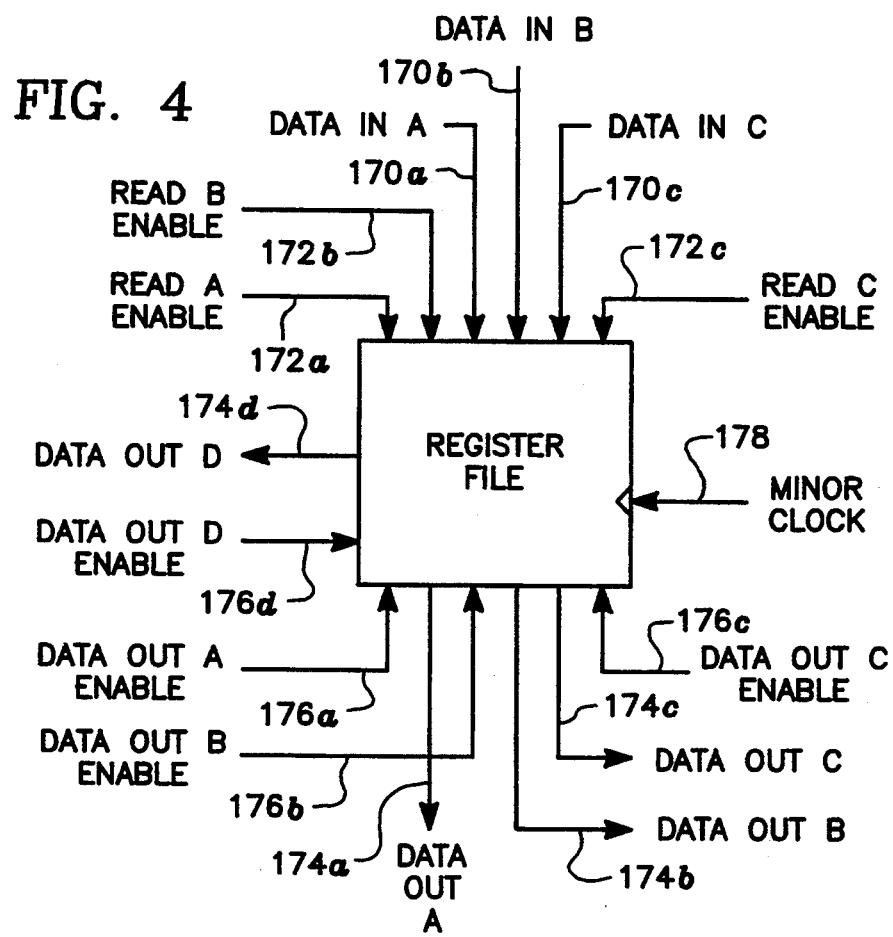
FIG. 4 is a simplified block diagram of a typical register file unit employed in the SIMD processor of FIG. 2.

The data inputs, data outputs and control inputs of a typical one of the register file units 122–132 are illustrated in FIG. 4. Different register file units have different numbers of data inputs and data outputs, as illustrated in FIG. 2. FIG. 4 illustrates a generic register file unit having three data inputs 170a–170c and four data outputs 172a–172d, not all of which need be used. Each data input 170 is controlled by a respective READ enable input 174a–174c while each data output 172 is controlled by a respective DATA OUT enable input 176a–176d. A minor clock input 178 synchronizes the operation of the register file unit.

Figure 5:
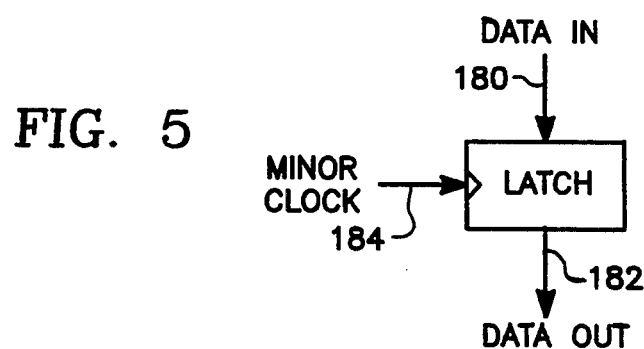
FIG. 5 is a simplified block diagram of a typical latch employed in the SIMD processor of FIG. 2.

FIG. 5 illustrates a typical one of the latches 153, which has a data input 180 and a data output 182 which are synchronized with a minor clock input 184.

Control Units

The SIMD processor 102 of FIG. 2 is controlled by a master control unit 186 and right and left slave control units 188, 190, respectively, which are subservient to the master control unit 186, and which are associated with the right and left processor element groups 118, 120, respectively. There are two control clock cycles, namely a major clock cycle and a minor clock cycle whose frequency is twice the major clock cycle in the preferred embodiment. The clock signals controlling the major and minor clock cycles are illustrated in FIGS. 6a and 6b, respectively. The master control unit 186 issues microinstructions in synchronism with the major clock cycle while the slave control units 188, 190 issue nanoinstructions in synchronism with the minor clock cycle. The nanoinstructions determine the type of data movements (fetch, store and routing) performed by the processor elements 102. Each slave control unit 188, 190 controls three processor elements in a respective one of the right and left processor element groups 118, 120, and therefore is capable of initiating three data movements during any one minor clock cycle, namely three read, three write or any combination thereof. Each microinstruction issued by the master control unit 186 contains two sets of instructions, one for each of the two processor element groups 118, 120. The master control unit 186 performs global control and synchronization. The master control unit 186 also controls the multiplexer 154 and can reconfigure the connections between the inputs and outputs of the multiplexer 154 once each major clock cycle. Specifically, each one of the two data inputs of the multiplexer 154 may be connected to either one of the two data outputs thereof, or may be left unconnected. Once each major clock cycle, each processor element 116 executes the instruction which the master control unit 186 has issued to the corresponding processor element group 118 or 120.

The control inputs 162, 166 of each processor element 116 illustrated in FIG. 3 and the control inputs 172, 176 of each register file unit illustrated in FIG. 4 are separately controlled by a respective one of the right and left slave control units 188, 190. The right slave control unit 188 controls the control inputs of processor elements 116 and the register file units 126, 128 in the right processor element group 118 as well as the data outputs of the register file units 122, 124 connected to the right register file unit 126, while the left slave control unit 190 controls the control inputs of the processor elements 116 and the register file units 128, 132 in the left processor element group 120 as well as the data outputs of the register file units 122, 124 connected to the left register file unit 128.

The key to programmable reconfigurability of the data flow in the SIMD processor 102 of FIG. 2 is that during any minor clock cycle, the slave control units can enable or disable any of the data inputs or data outputs under their respective control. As a very simple example, consider how the processor element 116c of FIG. 2 (see also FIG. 3) receives and multiplies two numbers a and b in one major clock cycle. Referring to FIGS. 6a and 6b, at time $t_1$ during the second minor cycle of a preceding major clock cycle, the register file unit 128 transmits the number a to the latch 153 and to the first data input of the processor element 116c. The first data input is not enabled at this time, but the number a is stored in the latch until the next minor clock cycle. During the next minor clock cycle at time $t_2$ of FIGS. 6a and b, the register file unit 128 transmits the number b to the latch and the first data input of the processor element 116c. At this time, both data inputs of the processor element 116c are enabled, so that the first data input receives the number b directly from the register file unit 128, while the second data input receives the number a from the latch 153. During the next major clock cycle, which happens to coincide with time $t_2$, the processor element 116c receives a microinstruction causing it to multiply the numbers a and b.

The organization of the control units 186, 188 and 190 as well as time multiplexing described above fills the gap between the memory and processor speeds. Data can be fetched and aligned with the adequate speed to sustain the peak performance of the processor elements 116. It also allows overlapping of the read and write operations and computation while reducing the microcode complexity. This decentralized control is also required for reconfigurability, since each processor element group 118, 120 can operate as an independent SIMD processor or pipeline processor with a separate instruction issued by the master control unit 186. Unlike SIMD processors of the prior art, the master control unit 186 synchronizes the whole architecture of FIG. 2 at two levels: (1) a primitive operation level where the processor elements 116 within a group are synchronized and (2) a basic operation level where both groups 118, 120 of processor elements are synchronized together. In the latter case, if the two processor element groups 118, 120 are operated as a single SIMD processor or as a single pipeline processor, the master control unit 186 applies a global synchronization to all processor elements.

Memory Organization and Programmable Data Paths

Figure 7:
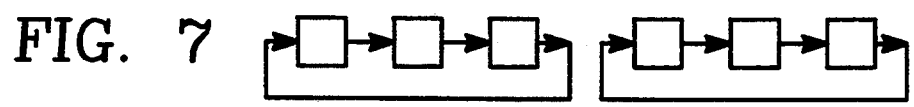
FIG. 7 illustrates a double ring architecture of the SIMD processor of FIG. 2.

FIG. 7 illustrated the dual ring structure achieved by the slave units 188, 190 activating the connections between the output of each processor element 116 within a group and the second data input its neighbor to the right. As mentioned previously herein, such a configuration is useful for performing two matrix-vector operations simultaneously, one operation within each of the groups 118, 120.

Figure 8:
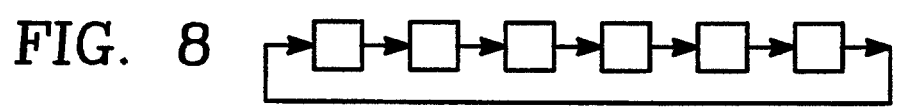
FIG. 8 illustrates a single ring structure of the SIMD processor of FIG. 2.

FIG. 8 illustrates the modification to the configuration of FIG. 7 in which the master control unit 186 enables the left-hand data input and the right-hand data output of the multiplexer 154, to achieve a single ring structure. As mentioned previously here, such a configuration is useful for performing matrix-matrix multiplication.

Figure 9:
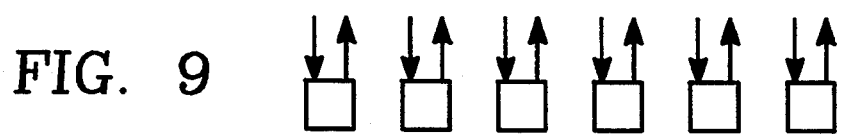
FIG. 9 illustrates a fully parallel architecture of the SIMD processor FIG. 2.

FIG. 9 illustrates that each of the six processing elements may be operated simultaneously and independently if desired, by enabling the direct input and output connections provided by the left and right input register file units 126, 128 and the left and right output register file units 130, 132.

Figure 10:
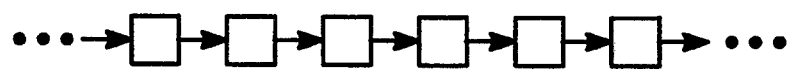
FIG. 10 illustrates a pipeline architecture of the SIMD processor of FIG. 2.

FIG. 10 illustrates the result achieved by enabling the left data input to the interface register file unit and the data output from the right register file unit 126 to the right interface unit 146 while connecting the "in-board" processor elements 116a, 116b through the multiplexer 154. This configuration is a single pipeline processor which, if repeated in all SIMD processors 102 in the system of FIG. 1, extends through a maximum number of stages.

Figure 11:
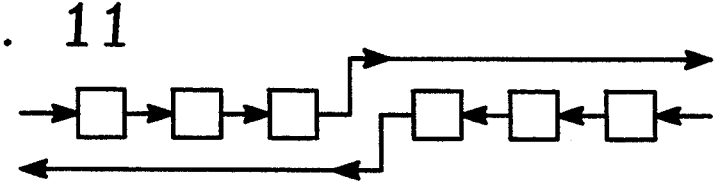
FIG. 11 illustrates a bi-directional pipeline architecture of the SIMD processor of FIG. 2.

FIG. 11 illustrates a bi-directional pipeline processor achieved by modifying the connections in the configuration of FIG. 10 so that data flows from the output of the left interface unit 148 to the "outboard" processor element 116c of the left processor element group 120 and from the "inboard" processor element of the same group to the data input of the right interface unit 146, while data flows from the output of the right interface unit 146 to the "inboard" processor element 116a of the right group 118 and form the "outboard" processor element of the same group to the input of the left interface unit 148 through appropriate ones of the register file units.

Many other variations and permutations of the foregoing configurations may be achieved by the skilled worker in accordance with the data path controls illustrated in FIGS. 2 through 4 by causing the slave units to enable or disable various data inputs and outputs of the register file units and of the processor elements, and need not be specifically described herein.

The architecture of FIG. 2 includes a hierarchical memory organization. Data are classified hierarchically as passive, active, operating and resulting. Passive data reside in the random access memory 152. Passive data consist of the constant data required in the computation of robot link parameters and the like, as well as the final results of computations to be transmitted to the host 100. Alternatively, the host 100 can read the final results directly from the right and left register file units 126, 128. Those constants which are required for actual computation are transferred to the input register file 122 during initialization or background time, which then become active data. The active data reside in the two input register file units 122, 124 and consist of data provided by the host 100 or by neighboring SIMD processors 102, and the constants required for computation. The basic feature of active data is that each data item can be fetched simultaneously and independently by both slave control units 188, 190 and transferred to the right and left register file units 126, 128, such data then being classified as operating data. The operating data reside in the right and left register file units 126, 128 and consist of the data which are fetched and aligned for the processor elements 116. The basic feature of operating data is that each data item can exist in both the right and left register file units 126, 128 and can be used by both processor element groups 118, 120 simultaneously. Furthermore, an operating data item can be simultaneously fetched for different processor elements 116. This feature is essential for exploiting parallelism in matrix-vector operations. The resulting data reside in the output register file units 130, 132 and represent the results of processor element operations. Like the active data, they can be simultaneously fetched by the two slave control units 188, 190 and transferred to the input right and left register file units 126, 128 to become operating data. At each minor cycle, three data items can be read from each of the right and left register file units 126, 128. Also, at each minor cycle, three data items can be written into each of the output left and right register file units 130, 132.

The foregoing memory organization provides the maximum flexibility for parallel computation, particularly for kinematic and dynamic computations. A data item can exist at different physical addresses, which allows simultaneous parallel operations on the same data item. Furthermore, data can be routed efficiently among the processing elements 116 and register file units. More importantly, there is parallelism in read and write operations and these read and write operations may be overlapped with the computation operations.

While the invention has been described in connection with a preferred embodiment in which the number of processor elements 116 in each group 118, 120 is a multiple of three and in which there are two groups, any number of processor elements 116 per group may be selected and any number of groups may be used within a single SIMD processor 102.

While the invention has been described in detail by specific reference to preferred embodiments thereof, it is understood that variations and modifications thereof may be made without departing from the true spirit and scope of the invention.

What is claimed is:

1. A reconfigurable multi-processor computer, comprising:
   (I) a host computer;
   (II) a system bus connected to said host computer;
   (III) a plurality of single-instruction-multiple data (SIMD) processor cells connected to said system bus, each of said SIMD processor cells comprising:

(A) a left processing ensemble and a right processing ensemble, each of said left and right processing ensembles comprising:
- (1) a plurality of n individual processors, each of said processors having plural operand inputs and a result output and being adapted to perform an operation upon plural operands received at said operand inputs to produce a result at said result output in accordance with an instruction received by said processor,
- (2) primary register file means having plural primary register file inputs and outputs, respective plural ones of said primary register file outputs connected to the first and second operand inputs of each of said individual processors for controlling data flow from primary register file inputs to said operand inputs,
- (3) input means for coupling one of said primary register file inputs to one of: (a) an adjacent one of said SIMD processor cells and (b) said system bus,
- (4) output means for coupling another one of said primary register file outputs to one of: (a) an adjacent one of said SIMD processor cells and (b) said System bus,
- (5) secondary register file means having plural secondary register file inputs connected to respective ones of said result outputs and a pair of secondary register file outputs connected to a primary register file input in a respective one of said left and right processing ensembles,
- (6) slave controller means for controlling connections between inputs and outputs in each one of said primary and secondary register file means;

(B) multiplexer means having left and right multiplexer inputs and left and right multiplexer outputs, said left and right multiplexer inputs being connected to result outputs of an inboard and an outboard one the individual processors of said left and right processing ensembles, respectively, said left and right multiplexer outputs being connected to an operand input of an outboard and an inboard one of said individual processors of said left and right processing ensembles, respectively; and (C) master controller means for controlling each slave controller means, transmitting individual instructions to each of said individual processor means specifying an operation to be performed thereby with respect to plural operand inputs thereof and controlling connections between said multiplexer inputs and outputs.

2. The multiprocessor computer of claim 1 wherein said slave controller means further controls said input and output means for coupling.

3. The multiprocessor computer of claim 1 wherein said master controller means operates in synchronism with a major clock cycle comprising plural minor clock cycles and said slave controller unit operates in synchronism with said minor clock cycles.

4. The multiprocessor computer of claim 1 further comprising plural latch means connected between each primary register file output and a corresponding one of said operand inputs, each of said latch means being characterized by a delay corresponding to one minor clock cycle.

5. The multiprocessor computer of claim 1 wherein said input and output means for coupling couple said one primary register file input and output to said bus through a host interface therewith.

6. The multiprocessor computer of claim 1 wherein said input and output means for coupling couple said one primary register file input and output to an adjacent one of said SIMD processor cells, wherein said input and output means for coupling together comprise:
- a left/right interface unit having an internal input and output and an external input and output, said external input and output being connected to an adjacent one of said SIMD processor cells;
- means for connecting one of said primary register file outputs to said internal input of said left/right interface unit;
- interface register file means shared in common by said left and right processor ensembles and having interface inputs and outputs;
- means for connecting one of said interface inputs to said internal output of said interface unit and for connecting one of said interface outputs to said internal input of said interface unit.

7. The multiprocessor computer of claim 6 wherein said interface register file unit comprises connections between said interface inputs and outputs, and wherein said slave controller unit comprises means for controlling said connections.

8. The multiprocessor computer of claim 6 wherein said input means for coupling couples said primary register file output associated with an outboard one of said processors to said left/right interface unit.

9. The multiprocessor computer of claim 1 wherein said primary and secondary register file means are controlled by said slave controller means to connect said plural individual processors within each processing ensemble in a ring to form a pair rings corresponding to said left and right processing ensembles respectively.

10. The multiprocessor computer of claim 1 wherein said primary and secondary register file means and said multiplexer connect the plural individual processors of both of said left and right processing ensembles in a single ring.

11. The multiprocessor computer of claim 1 wherein said primary and secondary register file units, said input and output means for coupling and said multiplexer means connect the plural individual processors of both the right and left processing ensembles of all of said plural SIMD processor cells in a single pipeline.

12. The multiprocessor computer of claim 11 wherein said single pipeline is one of (a) mono-directional and (b) bi-directional.

13. The multiprocessor computer of claim 1 wherein said master controller is controlled by said host computer.

14. The multiprocessor computer of claim 13 wherein said host computer comprises means for re-configuring the connections provided by said primary and second register file means in synchronism with a master clock cycle.

15. The multiprocessor computer of claim 1 wherein said plurality of individual processors comprise three processors whereby said computer is particularly adapted to perform matrix and vector operations of cardinality three.

16. A reconfigurable multiprocessor computer, including a bus, comprising:

a plurality of processor cells connected to said bus, each of said processor cells comprising:
(A) a right processing ensemble comprising:
(1) a plurality of n individual processors, each of said processors having plural operand inputs and a result output and being adapted to perform an operation upon plural operands received at said operand inputs to produce a result at said result output in accordance with an instruction received by said processor,
(2) primary register file means having plural primary register file inputs and outputs, respective plural ones of said primary register file outputs connected to the first and second operand inputs of each of said individual processors for controlling data flow from primary register file inputs to said operand inputs,
(3) input means for coupling one of said primary register file inputs to one of (a) an adjacent one of said processor cells and (b) said bus,
(4) output means for coupling another one of said primary register file outputs to one of: (a) an adjacent one of said SIMD processor cells and (b) said bus,
(5) secondary register file means having plural secondary register file inputs connected to respective ones of said result outputs and a pair of secondary register file outputs connected to a primary register file input in a respective one of said left and right processing ensembles,
(6) slave controller means for controlling connections between inputs and outputs in each one of said primary and secondary register file means; and
(B) master controller means for controlling said slave controller means and transmitting individual instructions to each of said individual processor means specifying an operation to be performed thereby with respect to plural operand inputs thereof.

17. The multiprocessor computer of claim 16 further comprising:
a left processing ensemble structurally identical to said first processor ensemble, the slave controller means of said left processing ensemble being controlled by said master controller means;
multiplexer means having left and right multiplexer inputs and left and right multiplexer outputs, said left and right multiplexer inputs being connected to result outputs of an inboard and an outboard one the individual processors of said left and right processing ensembles, respectively, said left and right multiplexer outputs being connected to an operand input of an outboard and an inboard one of said individual processors of said left and right processing ensembles, respectively; and
(C) said master controller means controlling connections between said multiplexer inputs and outputs.

18. The multiprocessor computer of claim 16 wherein said slave controller means further controls said input and output means for coupling.

19. The multiprocessor computer of claim 16 wherein said master controller means operates in synchronism with a major clock cycle comprising plural minor clock cycles and said slave controller unit operates in synchronism with said minor clock cycles.

20. The multiprocessor computer of claim 19 further comprising plural latch means connected between each primary register file output and a corresponding one of said operand inputs, each of said latch means being characterized by a delay corresponding to one minor clock cycle.

21. The multiprocessor computer of claim 16 wherein said input and output means for coupling couple said one primary register file input and output to an adjacent one of said processor cells, wherein said input and output means for coupling together comprise:
a left/right interface unit having an internal input and output and an external input and output, said external input and output being connected to an adjacent one of said SIMD processor cells;
means for connecting one of said primary register file outputs to said internal input of said left/right interface unit;
interface register file means having interface inputs and outputs;
means for connecting one of said interface inputs to said internal output of said interface unit and for connecting one of said interface outputs to said internal input of said interface unit.

22. The multiprocessor computer of claim 21 wherein said interface register file unit comprises connections between said interface inputs and outputs, and wherein said slave controller unit comprises means for controlling said connections.

23. The multiprocessor computer of claim 16 wherein said primary and secondary register file means are controlled by said slave controller means to connect said plural individual processors within said processing ensemble in a ring.

* * * * *